200-61.34

BEST AVAILABLE COPY

Examiner

769453

Aug. 19, 1969 W. STOI ET AL Re. 26,648

AUTOMATIC CANCELLING TURN SIGNAL WITH AN INTERMEDIATE SIGNAL POSITION WHICH IS MANUALLY OPERABLE AND RELEASABLE

Original Filed Oct. 11, 1965 2 Sheets-Sheet 1

INVENTORS.
Walter T. Stoi
Robert Thomson

BY
Learman & McCulloch
ATTORNEYS

INVENTORS.
Walter T. Stoi
Robert Thomson
BY
Learman & McCulloch
ATTORNEYS

United States Patent Office

Re. 26,648
Reissued Aug. 19, 1969

26,648

AUTOMATIC CANCELLING TURN SIGNAL WITH AN INTERMEDIATE SIGNAL POSITION WHICH IS MANUALLY OPERABLE AND RELEASABLE

Walter Stoi, Warren, and Robert Thomson, Dearborn Heights, Mich., assignors, by mesne assignments, to Essex International Inc., a corporation of Michigan Original No. 3,284,592, dated Nov. 8, 1966, Ser. No. 494,623, Oct. 11, 1965. Application for reissue Oct. 18, 1968, Ser. No. 769,453

Int. Cl. H01h *3/16*

U.S. Cl. 200—61.34 18 Claims

Matter enclosed in heavy brackets [ ] appears in the original patent but forms no part of this reissue specification; matter printed in italics indicates the additions made by reissue.

*ABSTRACT OF THE DISCLOSURE*

*Vehicle direction signal operating apparatus has an actuator movable manually from a neutral position to either one of two latched operating positions for operating selectively the vehicle's left or right direction signals and movable automatically from either operating position to the neutral position in response to operation of the vehicle's steering mechanism. Yieldable abutment means in the path of manual movement of the actuator from its neutral position toward either operating position arrests the actuator in an intermediate position in which a selected one of the left or right direction signals is operable. From either intermediate position the actuator may be returned automatically to its neutral position or alternatively to either of its latched operating positions.*

This invention relates to vehicle directional signaling apparatus and more particularly to apparatus which may be actuated to indicate an impending change in direction of the vehicle and in which the cancellation of the signaling indicators may be effected either in response to movement of the vehicle's steering mechanism or upon release of the actuating means by the vehicle's driver.

Direction signaling apparatus currently in use on most vehicles includes a manually operable actuator which may be moved from a neutral position to either one of two operating positions so as to indicate either a left-hand or a right-hand turn. The actuator of such mechanism conventionally is releasably latched in either of the operating positions and may be restored to its neutral position upon rotation of the vehicle's steering wheel through a predetermined arc. There are many instances, however, in which the driver of the vehicle wishes to signal a change in direction and which will not result in movement of the steering wheel through an arc sufficient to effect concellation of the signal. For example, a change of lanes on an expressway or other highway ordinarily will not require rotation of the vehicle's steering wheel through an arc sufficiently great to restore an actuated direction signal to its neutral position. In those instances where a driver actuates the vehicle's direction signal to indicate a lane change and then fails to cancel the direction signal, the vehicle may travel for many miles with the direction signal operating. Operation of a vehicle's direction signals under these circumstances can be both annoying and hazardous.

An object of this invention is to provide direction signaling apparatus which selectively may be moved from a neutral position to a latched operating position or from a neutral position to an unlatched operating position and which may be restored automatically to neutral position from either operating position.

Another object of the invention is to provide direction signaling apparatus of the character described which requires no substantial modification of the electrical circuitry of the vehicle with which the apparatus is intended for use.

A further object of the invention is to provide direction signaling apparatus of the kind referred to and which may be moved from its neutral position to either of the above referred to operating positions without requiring any substantial increase in the operating effort required to effect movement of the actuating mechanism to either operating position.

A further object of the invention is to provide direction signaling apparatus of the character described and in which movement of the actuating mechanism to either of the operating positions above referred to may be effected in the same way that the actuating mechanism of currently available direction signaling devices are adjusted.

Other objects and advantages of the invention will be pointed out specifically or will become apparent from the following description when it is considered in conjunction with the appended claims and the accompanying drawings, in which:

Figure 2:
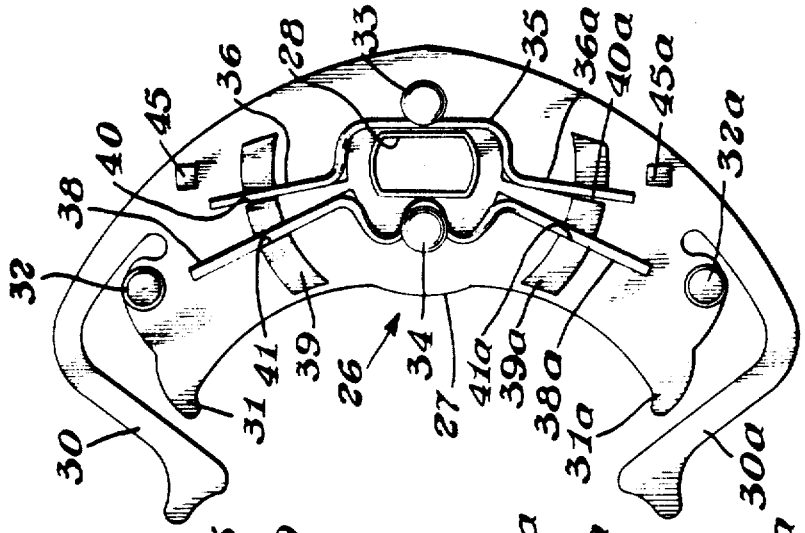
FIGURE 2 is an enlarged, bottom plan view of the actuating member of the direction signaling apparatus.
Figure 3:
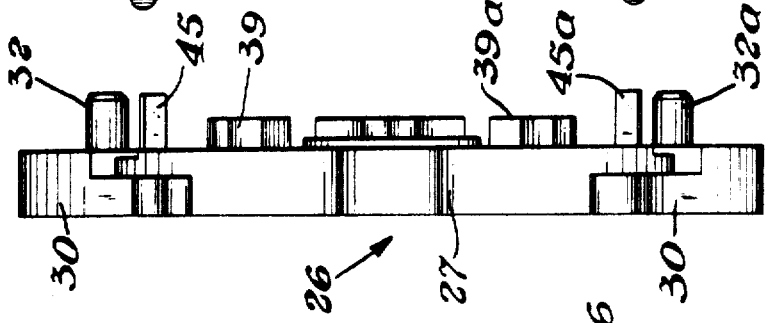
FIGURE 3 is a front elevational view of the actuating member.

Apparatus constructed in accordance with the invention is adapted for use in conjunction with a vehicle having a rotatable steering shaft 1 which may be rotated in response to rotation of the vehicle's steering wheel (not shown), and which includes a radially projecting canceling cam 2 that rotates with the shaft 1. Surrounding the shaft 1 is a tubular column terminating at its upper end in a housing 3 on which the direction signaling apparatus may be mounted.

The direction signaling apparatus constructed in accordance with the disclosed embodiment of the invention comprises a molded, arcuate casing or support 5 formed of insulating material such as nylon to which is integrally joined an annular flange 6 which may be secured to the housing 3 by suitable means such as screws 7. The casing 5 includes a base 8 from which depends a tubular boss 9 in which is mounted a shaft 10 which, at its upper end, is substantially rectangular in cross-section. A generally hourglass-shaped opening 11 is formed in the base 8 so as to permit oscillation of the shaft 10.

At one end of the casing 5 is an integral, flexible rib 12 at substantially the center of which is a latching detent 13 comprising a pair of spaced apart, outwardly projecting nodes 14 and 15 joined by substantially U-shaped web 16. Similar parts are provided at the opposite end of the casing and are identified by similar reference characters, followed by the suffix a.

Adjacent one end of the casing 5 is a raised shelf 17 on which is secured a pair of spaced apart, electrically conductive, fixed contacts 18 and 19 which may be connected by suitable wiring (not shown) to the right front and left rear signaling devices (not shown), respectively, of the vehicle. Similar parts are located at the opposite end of the casing and are identified by similar reference characters followed by the suffix a, it being understood that the fixed contacts 18a and 19a are connected respectively to the left front and right rear vehicle signaling devices.

The shelf 17 terminates adjacent the contact 19 in an abrupt wall 20 which forms one end of an opening 21 provided in the casing 5. Integrally joined to the shelf 17 is a resilient arm or finger 22, the other end of which projects beyond the wall 20 and is free, thereby enabling the free end of the arm 22 to flex toward and away from the adjacent rib 12. Adjacent the free end of the arm 22 is a stop block 23 which subsequently will be referred to in more detail.

It is preferred that a second flexible arm 24 be accommodated in the opening 21. One end of the arm 24 is integrally joined to the casing 5 and its other end projects toward but terminates short of the end wall 20 of the shelf 17. Thus, the arm 24 is capable of being flexed similarly to the arm 22. The arm 24 preferably includes a stop block 25 for a purpose presently to be described. Similar apparatus is provided at the opposite end of the casing 5.

Figure 1:
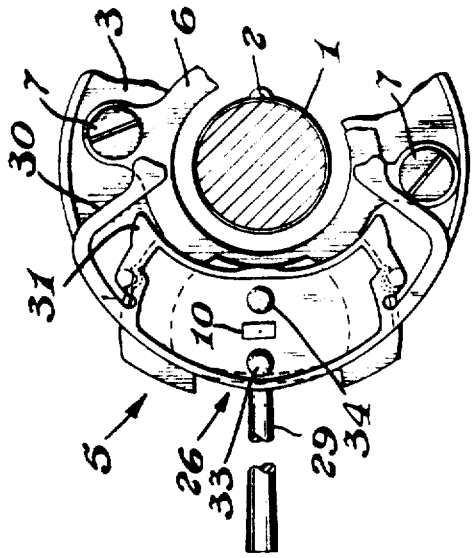
FIGURE 1 is a fragmentary plan view of direction signaling apparatus constructed in accordance with the invention and illustrating its relationship with the steering shaft of a vehicle, the shaft being shown in section.

An actuating member designated generally by the reference character 26 and molded of nylon or other insulating material includes an arcuate body ortion 27 having a generally rectangular opening 28 therein in which the shaft 10 may be accommodated so as to effect rocking movement of the actuating member in either of two opposite directions from the neutral position shown in FIGURE 1. To effect rocking of the actuating member, a handle 29 may be secured to the shaft 10 as is conventional.

At one end of the actuating member is provided an integral, flexible return finger 30 which projects toward, but is out of the path of rotation of the cam 2 when the actuating member is in its neutral position. Adjacent the finger 30 the body 27 of the actuating member terminates in an abutment 31 which normally is free of the arm 30, but which may be engaged by the latter under certain conditions which presently will be described. Also integrally formed on the under surface of the actuator body 27 is a latch post or detent 32 which, when the actuator and casing are assembled, engages the latching detent 13. Similar parts are provided at the opposite end of the actuating body 27 and are identified by similar reference characters followed by the suffix a.

Secured to the actuating member 26 is a pair of electrically conductive contacts 33 and 34. The contact 33 may be connected to the vehicle's battery (not shown) through a brake pedal operated switch (not shown) in a conventional manner. The contact 34 may be connected by wiring to the vehicle's battery through a flasher unit (not shown) as also is conventional. In electrical engagement with the contact 33 is an electrically conductive switch member 35 having arms 36 and 36a formed of springy material and which are adapted to engage the contacts 19, 19a, respectively. In electrical engagement with the contact 34 is a switch member 37 having arms 38 and 38a formed of springy material and which are adapted to be engaged with the contacts 18, 19 and 18a, 19a, respectively. The arms 36 and 38 are flexible and are maintained in spaced apart relation for movement with the actuating member by means of a positioning rib 39 formed on the under surface of the actuating member respective arms are accommodated. Similar means are and having a pair of grooves 40 and 41 in which the associated with the arms 36a and 38a.

The arms 38, 38a of the switching member 37 are longer than the arms of the switching member 35. The length of the latter arms is such that, when the actuating member is assembled with the casing, the arms 36, 36a span the distance between the fixed contacts 19, 19a and rest upon the latter when the actuator is in its neutral position. The arms of the switching member 37, however, project radially beyond the associated fixed contacts so as to span the distance between the flexible arms 22, 22a. When the actuator is in its neutral position, the arm 38 rests upon an upstanding platform 42 formed on the arm 22 and having downwardly inclined ramps 43 and 44 at its opposite ends. The level of the platform 42 is such that the arm 38, in the neutral position of the actuating member, is supported at a level above the level of the fixed contacts 18 and 19. A similar platform 42a is formed on the arm 23a so as to support the arm 38a above the level of the fixed contacts 18a and 19a when the actuating member is in its neutral position. The springiness of the arms 38, 38a, however, biases them in such direction as to move them toward the level of the respective fixed contacts. Accordingly, upon movement of the actuating member 26 in either direction about the axis of the shaft 10, the arms 38, 38a will ride down the appropriate ramps so as to engage the upper surfaces of the appropriate fixed contacts.

Figure 4:
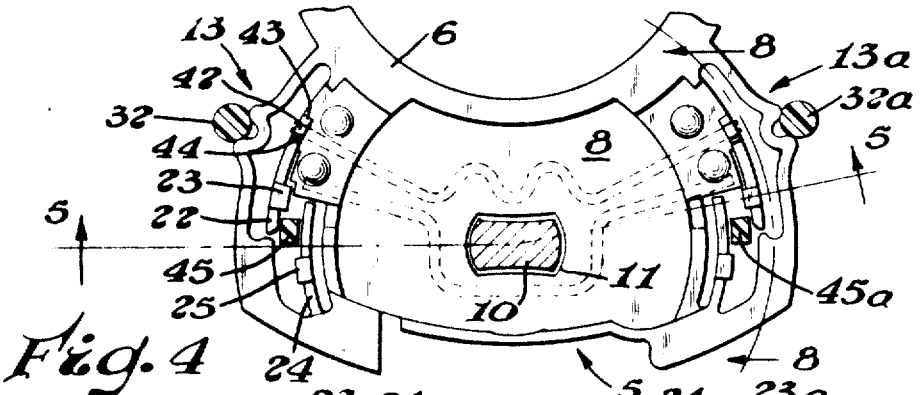
FIGURE 4 is an enlarged, fragmentary plan view of the support or switch casing of the direction signaling apparatus, with portions of the actuating member being shown in section and illustrating the positions of the parts when the actuating member is in its neutral position.
Figure 5:
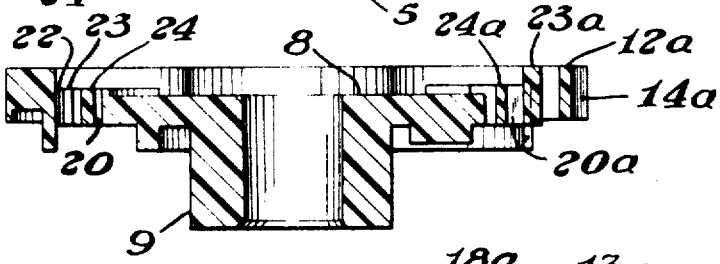
FIGURE 5 is a longitudinal sectional view taken on the line 5—5 of FIGURE 4.
Figure 7:
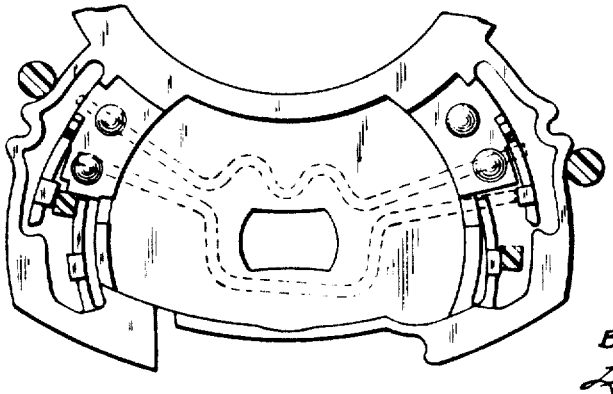
FIGURE 7 is a view similar to FIGURE 6, but illustrating the positions of the parts when the actuating member has been moved to one of its latched operating positions.

In the operation of the apparatus thus far described, movement of the operating handle 29 clockwise from the position shown in FIGURE 1 will effect corresponding movement of the actuating member 26 to an operating position in which the switching members 35 and 37 move clockwise from the positions shown in FIGURE 4 to the positions shown in FIGURE 7. In the latter positions, the arm 38 will have been moved off the platform 42 through such an arc as to engage the fixed contact 18. The arm 38a will have been moved off the platform 42a through a similar arc and into engagement with the contact 19a so as to supply to the contacts 18 and 19a intermittent electrical energy via the flasher unit and thereby enable the direction signaling devices at the right front and right rear of the vehicle to flash intermittently. The arm 36 of the switching member 35 will have moved through a similar arc, but will continue to engage the fixed contact 19 so as to enable current to be supplied to the latter upon the closing of the brake pedal actuated switch. The arm 36a, however, will have been moved clockwise to a position free of engagement with the contact 19a and out of circuit with the signaling devices of the vehicle.

Closewise movement of the actuating member 36 from the position shown in FIGURES 1 and 4 to the position shown in FIGURE 7 also will effect corresponding and over centering movement of the posts 32, 32a relative to the detents 13, 13a to positions in which the posts engage the nodes 15 and 14a, respectively, thereby yieldably latching the actuating member in its operating position. In these positions of the parts, the return finger 30 will lie in the path of rotation of the cam 2 so that, upon counterclockwise rotation of the steering shaft 1, the cam 2 will engage the finger 30 and urge it into engagement with the abutment 31 so as to restore the actuating member to its neutral position.

It will be understood that the actuating member 26 may be rocked counterclockwise from the position shown in FIGURE 1 so as to effect relative movement of the members 4 and 26 to such positions that the switching member 37 engages the contacts 19, 18a and the switch ing member 35 engages only the contact 19a, in which event the direction signaling devices, at the left-hand side of the vehicle will be actuated to indicate a left-hand turn.

Upon movement of the actuator member to either of the operating positions just described, the actuating member will be latched in the selected operating position until such time as it is restored to its neutral position in response to engagement of the cam 2 with the appropriate return finger 30, 30a. Apparatus constructed in accordance with the invention, however, includes means for arresting the actuating member in either one of two intermediate positions in which the direction signaling devices may be operated, but from either of which the actuating member may be restored to its neutral position without regard to rotation of the steering mechanism, and from either of which the actuator may be moved to one of its latched operating positions. The means for arresting the actuating member in an intermediate position comprises a pair of depending stop posts or blocks 45 and 45a located adjacent opposite ends of the actuator body 27 and formed integrally therewith. The post 45 is of such size and is so located that, when the actuator 26 is in its neutral position, the post 45 occupies a position (see FIGURE 4) between the flexible fingers 22 and 24 and between the stop members 23 and 25. The post 45a occupies a similar position between the arms 22a and 24a. The blocks 23, however, lies in the path of clockwise movement of the post 45, and the block 25 lies in the path of counterclockwise movement of the post 45. Similarly, the block 23a lies in the path of counterclockwise movement of the post 45a, and the block 25a lies in the path of clockwise movement of the post 45a.

Figure 6:
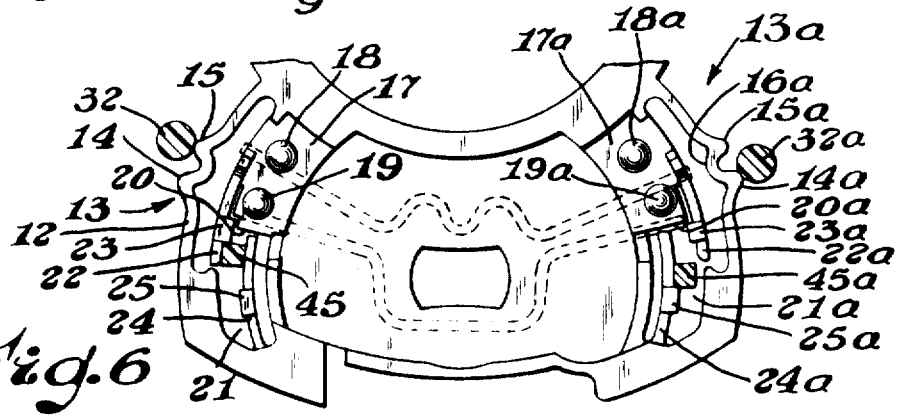
FIGURE 6 is a view similar to FIGURE 4, but illustrating the positions of the parts when the actuating member is moved to an intermediate, unlatched operating position.

Upon movement of the handle 29 to effect clockwise rocking of the actuator 26 clockwise from the position shown in FIGURE 1, the posts 45 and 45a will move clockwise from the positions shown in FIGURE 4 to the positions shown in FIGURE 6 and in which they engage the blocks 23 and 25a, respectively. Upon engagement of the posts and stop blocks, the operator will encounter some resistance to further clockwise rocking of the actuator member and, although the resistance is not great, it will signify to the operator that the actuating member has been moved through an arc to an intermediate or arrested position between its neutral position and one of its fully adjusted operating positions.

In the intermediate position referred to above, the arm 36 of the switch member 35 will remain in engagement with the contact 19 and the arm 38 will have moved down the ramp 43 so as to engage the contact 18. The arm 36a will have moved out of engagement with the contact 19a, and the arm 38a will have moved down the ramp 44a and into engagement with the contact 19a, thereby enabling the direction signaling devices at the right-hand side of the vehicle to flash intermittently. In the arrested positions of the parts, however, the actuator body will not have been moved clockwise through an arc of such magnitude as to effect over centering of the latch parts 13, 13a and 32, 32a. Thus, in the positions of these parts shown in FIGURE 6, the nodes 15 and 14a exert forces on the respective posts 32 and 32a tending to restore the actuating member to its neutral position. In order to maintain the actuating member in its immediate position, therefore, the operator must hold the handle 29 in its adjusted position. Upon release of the handle by the operator, the resilience of the latch detents 13, 13a will effect restoration of the actuating member to its neutral position and effect cancellation of the direction signaling devices.

Figure 8:
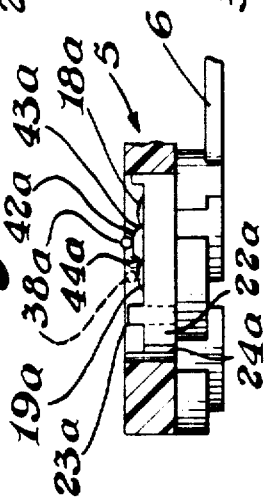
FIGURE 8 is an enlarged, sectional view taken on the line 8—8 of FIGURE [6] *4*.

FIGURE 8 shows in full lines the position of the arm 38a when it is in its neutral position atop the platform 42a. In the dotted line position just to the left of the platform, the arm 38a is shown in its intermediate position and, to the left of that position, the arms 38a is shown in its fully operating position.

When it is desired to move the actuating member to either of its fully adjusted or latched operating positions, the stop posts 45, 45a will engage the associated stop blocks, whereupon the application of a slight additional force on the operating handle 29 will enable the flexible fingers 22, 24 and 22a, 24a to be deflected or withdrawn from the paths of posts 45, 45a and permit movement of the blocks 45, 45a past the associated arm-mounted stops. Once the detent posts 32, 32a have been shifted to an over center position with respect to the associated detents 13, 13a, the actuating member will be biased toward and releasably latched in one of its operating positions as aforesaid. Movement of the actuating member beyond its fully adjusted or latched operating positions is limited by engagement of the posts 45, 45a with the respective end walls 20, 20a of the shelf members 17, 17a.

The disclosed embodiment is representative of a presently preferred form of the invention, but is intended to be illustrative rather than definitive thereof. The invention is defined in the claims.

We claim:

1. In direction signaling apparatus of the kind having an actuating member mounted on a support member for movement from a neutral position toward a latched operating position, electrical contact means operable in response to such movement to condition an electrical circuit for operation, and operating means for moving said actuating member from said neutral position toward said latched position: abutment means on said members engageable in response to movement of said actuating member from said neutral position toward said latched position to arrest said actuating member in an intermediate position between said neutral position and said latched position and in which said electrical contacts are operable to condition said circuit for operation, said operating means being capable of exerting sufficient force on said actuating member to disable said abutment means and move said actuating member from said intermediate position to said latched position *; and return means independent of said operating means for returning said actuating member from said latched position to said neutral position.*

2. Apparatus as set forth in claim 1 including means reacting between said members for biasing said actuating member to said neutral position from said intermediate position.

3. Apparatus as set forth in claim [2] *1* including means reacting between said members in response to movement of said actuating member past said intermediate position toward said operating position to bias said actuating member toward said operating position.

4. In direction signaling apparatus of the kind having an actuating member mounted on a support member for movement from a neutral position toward a latched operating position, electrical contact means operable in response to such movement to condition an electrical circuit for operation, and operating means for moving said actuating member from said neutral position toward said latched position: first abutment means carried by said actuating member; second abutment means carried by said support member in the path of movement of said first abutment means and engageable with the latter in response to movement of said actuating member from said neutral position toward said latched position to arrest said actuating member in an intermediate position between said neutral position and said latched position and in which said electrical contacts are operable to condition said circuit for operation, at least one of said abutment means being yieldable, said operating means being capable of exerting sufficient force on said actuating member to deflect said yieldable abutment means and enable movement of said actuating member from said intermediate position to said latched position*; and return means independent of said operating means for returning said actuating member from said operating position to said neutral position.*

5. Apparatus as set forth in claim 4 including means reacting between said support member and said actuating member for biasing the latter to said neutral position from said intermediate position.

6. Apparatus as set forth in claim 4 including means reacting between said support member and said actuating member in response to movement of the latter past said intermediate position toward said operating position to bias said actuating member toward said operating position.

7. Apparatus as set forth in claim 4 wherein said one of said abutment means is carried by said support member.

8. Direction signaling apparatus comprising a support member; first electrical contact means carried by said support member; an actuating member mounted on said support member for movement from a neutral position to a latched position; second electrical contact means connected to said actuating member for movement with the latter into and out of engagement with said first contact means; cooperable stop means on each of said members engageable with one another in response to movement of said actuating member from said neutral position toward said latched position for arresting said actuating member in an intermediate position between said neutral and latched positions; [and] operating means for moving said actuating member from said neutral position to said intermediate position and being capable of exerting sufficient force on said actuating member to disable said stop means and move said actuating member to said latched position, said first and second contact means being so located relatively to said members that they are out of engagement with one another when said actuating member is in said neutral position and are in engagement with one another when said actuating member is in each of said intermediate and operating positions; *and return means independent of said operating means for returning said actuating member from said operating position to said neutral position.*

9. Apparatus as set forth in claim 8 wherein one of said stop means is flexible whereby said one of said stop means may be displaced relatively to the other of said stop means to permit said actuating member to be moved from said intermediate position to said operating position.

10. Apparatus as set forth in claim 8 including means reacting between said support means and said actuating member for biasing the latter to said neutral position from said intermediate position.

11. Apparatus as set forth in claim 8 including means reacting between said support member and said actuating member in response to movement of the latter past said intermediate position toward said operating position to bias said actuating member toward said latched position.

12. Direction signaling apparatus comprising a support member; first electrical contact means carried by said support member; an actuating member mounted on said support member for rocking movement about an axis from a neutral position to an operating position; second electrical contact means connected to said actuating member for rocking movement with the latter into and out of engagement with said first contact means; yieldable stop means on one of said members; second stop means on the other of said members and engageable with said yieldable stop means in response to movement of said actuating member to an intermediate position between said neutral and operating positions for arresting movement of said actuating member to said operating position, said first and second contact means being so located relatively to said members that they are out of engagement with one another when said actuating member is in said neutral position and are in engagement with one another when said actuating member is in each of said intermediate and operating positions; [and] *operating* means connected to said actuating member for rocking the latter from said neutral position to said intermediate position and for applying a force of such magnitude on said actuating member as to enable said second stop means to deflect said yieldable stop means and effect movement of said actuating member to said operating position; *and return means independent of said operating means for returning said actuating member from said operating position to said neutral position.*

13. Apparatus as set forth in claim 12 wherein said yieldable stop means is mounted on said support member.

14. Apparatus as set forth in claim 12 including spring means acting on said members and biasing said actuating member to said neutral position from said intermediate position.

15. Apparatus as set forth in claim [14] *12* including cooperable latch means on said members operable to latch said operating member in said operating position.

16. Direction signaling apparatus for use with cam means rotatable in a path, said apparatus comprising a support member; first electrical contact means carried by said support member; an actuating member; means mounting said actuating member on said support member for rocking movement about an axis from a neutral position to an operating position; second electrical contact means connected to said actuating member for rocking movement with the latter into and out of engagement with said first contact means; yieldable stop means on one of said members; second stop means on the other of said members and engageable with said yieldable stop means in response to movement of said actuating member to an intermediate position between said neutral and operating positions for arresting movement of said actuating member to said operating position, said first and second contact means being so located relatively to said members that they are out of engagement with one another when said [acuating] *actuating* member is in said neutral position and are in engagement with one another when said actuating member is in each of said intermediate and operating positions; means connected to said actuating member for rocking the latter from said neutral position to said intermediate position and for applying a force of such magnitude on said actuating member as to enable said second stop means to deflect said yieldable stop means and effect movement of said actuating member to said operating position; cooperable latch means on said members engageable to latch said actuating member in said operating position; and return means carried by said actuating member and movable into the path of movement of said cam means for engagement thereby in response to movement of said actuating member to said operating position, engagement between said cam means and said return means being operable to disengage said latch means and return said actuating member to said neutral position.

17. Apparatus as set forth in claim 16 including spring means acting on said members and biasing said actuating member to said neutral position from said intermediate position.

18. Apparatus as set forth in claim [12] *16* including spring means acting on said members and biasing said actuating member to said operating position from said intermediate position.

References Cited

The following references, cited by the Examiner, are of record in the patented file of this patent or the original patent.

UNITED STATES PATENTS

| | | | |
|---|---|---|---|
| 1,794,193 | 2/1931 | McKerlie | 200—61.34 |
| 1,850,549 | 3/1932 | Johnson | 200—61.37 |
| 2,924,680 | 2/1960 | Swenson | 200—61.3 |

FOREIGN PATENTS

| | | |
|---|---|---|
| 448,844 | 8/1927 | Germany. |
| 1,060,454 | 7/1959 | Germany. |

ROBERT K. SCHAEFER, Primary Examiner

R. A. VANDERHYE, Assistant Examiner

U.S. Cl. X.R.

200—61.27, 166